(12) United States Patent
Lambricht et al.

(10) Patent No.: US 10,392,292 B2
(45) Date of Patent: *Aug. 27, 2019

(54) COATED SUBSTRATE FOR SOLAR CONTROL

(71) Applicant: AGC GLASS EUROPE, Louvain-la-Neuve (BE)

(72) Inventors: Thomas Lambricht, Perwez (BE); Jean-Michel Depauw, Brussels (BE); Ingrid Marenne, Forville (BE); Francois Boland, Gemboux (BE); Audrey Dogimont, Sart-Dames-Avelines (BE); Aline Degand, Bleret (BE); Kadosa Hevesi, Namur (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 53 days.

This patent is subject to a terminal disclaimer.

(21) Appl. No.: 15/737,617

(22) PCT Filed: Jun. 14, 2016

(86) PCT No.: PCT/EP2016/063636
§ 371 (c)(1),
(2) Date: Dec. 18, 2017

(87) PCT Pub. No.: WO2016/202801
PCT Pub. Date: Dec. 22, 2016

(65) Prior Publication Data
US 2018/0170794 A1  Jun. 21, 2018

(30) Foreign Application Priority Data
Jun. 19, 2015 (EP) .................................... 15172972

(51) Int. Cl.
| B32B 15/04 | (2006.01) |
| B32B 17/06 | (2006.01) |
| C03C 3/087 | (2006.01) |
| C03C 4/00 | (2006.01) |
| C03C 4/02 | (2006.01) |
| C03C 17/36 | (2006.01) |

(52) U.S. Cl.
CPC ............ *C03C 3/087* (2013.01); *C03C 4/0092* (2013.01); *C03C 4/02* (2013.01); *C03C 17/36* (2013.01); *C03C 17/366* (2013.01); *C03C 17/3626* (2013.01); *C03C 17/3639* (2013.01); *C03C 17/3642* (2013.01); *C03C 17/3644* (2013.01); *C03C 17/3649* (2013.01); *C03C 17/3652* (2013.01); *C03C 17/3681* (2013.01); *C03C 2217/212* (2013.01); *C03C 2217/216* (2013.01); *C03C 2217/256* (2013.01); *C03C 2217/258* (2013.01); *C03C 2217/281* (2013.01); *C03C 2218/156* (2013.01)

(58) Field of Classification Search
USPC ................................ 428/426, 432, 434, 688
See application file for complete search history.

(56) References Cited

U.S. PATENT DOCUMENTS

| 5,023,210 | A | * | 6/1991 | Krumwiede | ............ C03C 3/087 501/71 |
| 5,728,471 | A | * | 3/1998 | Dupont | .................... C03C 3/078 296/218 |
| 5,800,933 | A | | 9/1998 | Hartig et al. | |
| 6,014,872 | A | | 1/2000 | Hartig et al. | |
| 6,998,362 | B2 | * | 2/2006 | Higby | ....................... C03C 1/00 501/71 |
| 7,005,182 | B1 | * | 2/2006 | Hecq | ....................... C03C 3/087 428/215 |
| 7,169,722 | B2 | * | 1/2007 | Landa | ..................... C03C 3/087 501/71 |
| 9,434,635 | B2 | * | 9/2016 | Horsley | ................... C03C 3/087 |
| 2004/0110625 | A1 | * | 6/2004 | Smith | .................... C03B 5/2353 501/72 |
| 2005/0148453 | A1 | * | 7/2005 | Coster | ..................... C03C 3/095 501/64 |
| 2006/0159932 | A1 | | 7/2006 | Lu et al. | |
| 2006/0292381 | A1 | | 12/2006 | Kriltz et al. | |
| 2007/0161492 | A1 | * | 7/2007 | Smith | ..................... C03C 1/002 501/64 |
| 2007/0191205 | A1 | * | 8/2007 | Delmotte | ................ C03C 3/087 501/55 |
| 2007/0213196 | A1 | * | 9/2007 | Jones | ....................... C03C 1/00 501/70 |
| 2007/0243993 | A1 | * | 10/2007 | Heithoff | .................. C03C 3/087 501/71 |
| 2008/0149902 | A1 | | 6/2008 | Teyssedre | |
| 2009/0205956 | A1 | | 8/2009 | Lu et al. | |
| 2012/0058879 | A1 | * | 3/2012 | Kim | .......................... C03C 4/02 501/64 |

(Continued)

FOREIGN PATENT DOCUMENTS

| WO | WO 2005/115747 A1 | 12/2005 |
| WO | WO 2013/131850 A1 | 9/2013 |

(Continued)

OTHER PUBLICATIONS

International Search Report dated Sep. 23. 2016, in PCT/EP2016/063636 filed Jun. 14, 2016.

*Primary Examiner* — Lauren R Colgan
(74) *Attorney, Agent, or Firm* — Oblon, McClelland, Maier & Neustadt, L.L.P.

(57) ABSTRACT

The invention relates to substrates, in particular to transparent substrates, optionally colored, coated with an infrared-reflecting layer and capable of being used as glazing in buildings or in vehicles. Said coated substrates are made up of the combination of a glass substrate in which the composition has a redox of less than 15%, characterized by infrared reflection $RIR_V$ so that $RIR_V \geq 1.087*TL_V$, wherein $TL_V$ is the light transmission of the glass, and an infrared reflecting layer characterized by light transmission $TL_C$ so that $TL_C \geq 1.3*TIR_C$, wherein $TIR_C$ is the infrared transmission of the layer.

12 Claims, No Drawings

(56) References Cited

U.S. PATENT DOCUMENTS

| | | | |
|---|---|---|---|
| 2012/0315410 A1 | 12/2012 | Heithoff et al. | |
| 2014/0017500 A1* | 1/2014 | Koike | C03C 3/085 |
| | | | 428/410 |
| 2014/0249014 A1* | 9/2014 | Lee | C03C 3/087 |
| | | | 501/11 |
| 2014/0347722 A1 | 11/2014 | Hevesi | |
| 2015/0344354 A1* | 12/2015 | Cho | C03C 4/02 |
| | | | 252/587 |
| 2016/0002094 A1* | 1/2016 | Lambricht | C03C 3/087 |
| | | | 501/71 |
| 2016/0122236 A1 | 5/2016 | Mahieu et al. | |
| 2016/0152511 A1* | 6/2016 | Lambricht | C03C 3/091 |
| | | | 359/351 |
| 2018/0194667 A1* | 7/2018 | Lambricht | C03C 3/087 |

FOREIGN PATENT DOCUMENTS

| | | |
|---|---|---|
| WO | WO 2014/191484 A2 | 12/2014 |
| WO | WO 2015/011044 A1 | 1/2015 |

\* cited by examiner

COATED SUBSTRATE FOR SOLAR CONTROL

The present invention relates to substrates, in particular transparent substrates, for example made of glass, or optionally made of colored glass, which are coated with an infrared-reflecting layer.

Such coated substrates are used for example as glazings of buildings or vehicles, in single or multiple structures.

In the present document, unless otherwise indicated, the following terms are used in accordance with the following definitions:

TL=light transmission=percentage of the incident light flux transmitted by a product (between 380 and 780 nm) with illuminant C and a 2° observer.

$TL_V$=light transmission of the substrate=percentage of the incident light flux transmitted by the glass substrate (between 380 and 780 nm) with illuminant C and a 2° observer. It is here defined for a glass of 4 mm thickness.

$TL_C$=light transmission of the layer=percentage of the incident light flux transmitted by a product consisting of the layer deposited on a substrate having a zero absorption (between 380 and 780 nm) with illuminant C and a 2° observer.

RL=light reflection=percentage of the incident light flux reflected by a product (between 380 and 780 nm) with illuminant C and a 2° observer.

SF=g=solar factor=the percentage of incident energy radiation that is directly transmitted by the product, on the one hand, and absorbed by said product, then radiated by its face opposite to the energy source, on the other hand, calculated according to standard EN410:2011.

S=select=selectivity=the ratio of the light transmission to the solar factor.

TIR=infrared transmission=percentage of the infrared radiation transmitted (between 780 and 2500 nm) by a product, calculated according to standard ISO 9050: 2003.

$TIR_C$=infrared transmission of the layer=percentage of the infrared radiation transmitted (between 780 and 2500 nm) by a product consisting of the layer deposited on a substrate having a zero absorption, and calculated according to standard ISO9050: 2003.

RIR=infrared reflection=percentage of the infrared radiation reflected (between 780 and 2500 nm) by a product, calculated according to standard ISO 9050: 2003.

$RIR_V$=infrared reflection of the substrate with an ideal reflector=percentage of the infrared radiation reflected (between 780 nm and 2500 nm) for the glass substrate bearing an ideal layer reflecting 100% in the infrared. It is defined here for a glass substrate of 4 mm thickness, the layer being deposited on the face opposite the incident radiation, and calculated according to standard ISO9050: 2003. The maximum $RIR_V$ value of 100% is reached when there is no absorption in the glass, and $RIR_V$ decreases as the absorption in the glass increases, along the optical path amounting to 2*4 mm (round-trip)=8 mm.

$RIR_C$=infrared reflection of the layer=percentage of the infrared radiation reflected (between 780 and 2500 nm) for a product comprising the layer deposited on a substrate having a zero absorption, calculated according to standard ISO9050: 2003.

AIR: infrared absorption=percentage of the infrared radiation absorbed (between 780 and 2500 nm) by a product, calculated according to standard ISO 9050: 2003.

$AIR_C$=infrared absorption of the layer=percentage of the infrared radiation absorbed (between 780 and 2500 nm) for a product comprising the layer deposited on a substrate having a zero absorption, calculated according to standard ISO9050: 2003.

In certain circumstances, it is desirable for the glazings of buildings or vehicles not to let pass too great a proportion of total incident solar radiation in order not to overheat the interior of the building or passenger compartment while nonetheless offering a suitable light transmission (TL) so as to procure a sufficient light level in the interior of the building or passenger compartment. The transmission of total incident solar radiation may be expressed in terms of solar factor (SF or g). These somewhat conflictual requirements convey the desire to obtain a glazing having a high selectivity (S). It is also desirable for the glazings to meet certain aesthetic criteria in terms of light reflection (RL) and color in reflection.

For a certain amount of time already, to decrease the delivery of solar energy to buildings or vehicles, use has been made of glasses that are colored in their bulk. Colored glazings, in addition to offering various widely appreciated aesthetics, allow the passage of the infrared radiation responsible for interior heating to be decreased (said radiation mainly being absorbed by the glass) while letting pass visible light, and therefore thus exhibit selectivity.

Subsequently, another proposed solution was the use of multilayer solar-control coatings (also sometimes called anti-solar or solar-protection coatings) on substrates made of clear then extra-clear glass. These multilayer solar-control stacks offer a good selectivity as they let visible light pass and reflect the infrared. Examples of known solar-control coatings generally comprise a plurality of layers of an infrared-reflecting metal, such as silver, each thereof being sandwiched between transparent and anti-reflective layers of dielectric material. The selectivity of this type of stack increases as the number of infrared-reflecting layers present in the coating increases, ensuring enhanced reflection of the infrared. However, it still proves to be difficult for these solar-control coatings to ensure not only a high selectivity, but also a pleasant aesthetic appearance, a neutral color in reflection that is angularly stable and a moderate light reflection.

Thus, it would have been thought that combining these two solutions (substrate colored in its bulk and solar-control layer) would lead to a corresponding improvement in the selectivity of a glazing, but the infrared radiation passes two times through the colored glass (a first time from the sun to the interior, and a second time after reflection from the solar-control layer to the exterior), it turns out that the latter absorbs two-times more infrared, some of which it emits towards the interior, and furthermore heats up dangerously to the point sometimes of breaking. One solution is then to temper the glass in order that it resists thermal breakage, but this is a costly and constraining additional step.

There is therefore still a need to provide highly selective glazings, which in particular are colored or of low light transmission, having a low light reflection from the glass side (i.e., once mounted, seen from the exterior of the building/vehicle), a lower angular dependency of the color in reflection from the glass side, and that do not need to be tempered to prevent breakage due to thermal heating.

In other circumstances in contrast, it may be desirable to operate with what are called low-emissivity insulating glazings, i.e. glazings that have the property of reflecting the infrared radiation emitted for example by the interior of dwellings, therefore limiting heat losses, and of letting pass some solar energy in order to obtain a free supply of energy delivered from the sun to the interior of the building. Once again, it is preferable for light transmission to be as high as possible. These two requirements of low emissivity and high transmission normally lead to solutions that are opposed in terms of structure, it is in this case also necessary to make difficult compromises.

To offer low-emissivity glazings, the most common practice is to have systems of thin layers that comprise one or more layers capable of reflecting the infrared radiation. Examples of known low-emissivity coatings generally comprise one or even a plurality of layers of an infrared-reflecting metal, such as silver, sandwiched between transparent and anti-reflective layers of dielectric material.

In these cases here as well, the use of a colored substrate may be envisioned, with the same drawback that the enhanced absorption may induce overheating and that it is sometimes necessary to implement a tempering step in order for the glass to resist breakage.

There is therefore also still a need to provide low emissivity glazings, in particular colored low-emissivity glazings, that increase the supply of free energy, have a low light reflection from the glass side (i.e., once mounted, seen from the exterior of the building/vehicle), a lower angular dependency of the color in reflection from the glass side, and that do not need to be tempered to prevent breakage due to thermal heating.

It has been discovered that these combinations of required optical properties may be achieved and other advantages may be obtained, by a coated substrate according to claim 1 of the present invention, the dependent claims presenting preferred embodiments.

The subject of the present invention is in particular a transparent substrate coated with an infrared-reflecting layer, characterized in that the substrate is a glass characterized by an infrared reflection $RIR_V$ such that $RIR_V \geq 1.087*TL_V$ and in that the infrared-reflecting layer is characterized by a light transmission $TL_C$ such that $TL_C \geq 1.3*TIR_C$.

Thus the solution provided by the present invention is at the least counter-intuitive, because it demonstrates that it is necessary to associate a selective coating with a glass that, itself, is non-selective, in order to get a glazing the selectivity of which is improved or, at the very least, satisfactory for the desired applications. Specifically, it has been found that, conventionally, for selective glasses, a decrease in light transmission (for aesthetic reasons, for solar-control reasons or for any other reason) is invariably related to a drastic decrease in $RIR_V$. In contrast, the substrates according to the invention allow lower light transmissions to be achieved while preserving a very advantageous infrared reflection. Furthermore, it has been found that all infrared-reflecting layers are not equally suitable for achieving the aims of the invention and that layers that block infrared mainly by reflection, rather than absorption, are necessary.

Thus therefore, the substrates according to the invention, combined with an infrared-reflecting coating according to the invention, may allow single or multiple glazings having one or more of the following advantages to be obtained:

With a highly selective coating,
  a high selectivity even when the glazing comprises a substrate made of glass of low light transmission,
  an improved selectivity with respect to the same coating deposited on a glass of the same light transmission of the prior art having an infrared reflection $RIR_V$ such that $RIR_V < 1.087*TL_V$,
  a decrease in the energy transmitted to the interior of the building or vehicle (decrease of the solar factor), and therefore less heating of the latter, With a low-emissivity coating,
  an increase in the energy transmitted to the interior of the building, and therefore an enhanced supply of free energy,
  a limitation of the heating of the glazing (decrease of the absorption), a lower risk of breakage and a decrease in the need for tempering, at equivalent solar factor,
  various aesthetics and colors,
  attenuated reflection of light from the glass side, and therefore a less reflective appearance seen from the exterior of the building or vehicle, for a given level of light transmission and/or a given selectivity,
  a possible correction, by virtue of the substrate made of colored glass, of the color in reflection from the glass side created by the coating, without impact on properties such as selectivity for example,
  a lesser angular dependency of the color in reflection from the glass side, and therefore a more uniform appearance of the color of a curtain wall of a building or of the glazings of a vehicle whatever the location of the glazing within the curtain wall or the angle of installation thereof in the vehicle, without impact on properties such as selectivity.

The benefit of these advantages is even greater for substrates made of thick glass, for which, precedingly, the absorption and the energy reemitted toward the interior of the building or vehicle increased with thickness. The same is also valid for situations in which the sun is very high in the sky and/or the path of its rays through a glazing in a relatively vertical position is longer.

Preferably, the substrate according to the invention is a glass characterized by an infrared reflection $RIR_V$ such that $RIR_V \geq 1.087*TL_V+5$, more preferably such that $RIR_V \geq 1.087*TL_V+10$, and even more preferably such that $RIR_V \geq 1.087*TL_V+15$.

Alternatively, the substrate according to the invention is a glass characterized by an infrared reflection $RIR_V$ such that $RIR_V \geq 1.141*TL_V$, more preferably such that $RIR_V \geq 1.196*TL_V$, and even more preferably such that $RIR_V \geq 1.250*TL_V$.

Also alternatively, the substrate according to the invention is a glass characterized by an infrared reflection $RIR_V$ such that $RIR_V \geq 1.033*TL_V+5$ or such that $RIR_V \geq 1.033*TL_V+10$ or such that $RIR_V \geq 1.033*TL_V+15$, alternatively such that $RIR_V \geq 0.978*TL_V+10$ or such that $RIR_V \geq 0.978*TL_V+15$ or such that $RIR_V \geq 0.978*TL_V+20$, or also alternatively such that $RIR_V \geq 0.924*TL_V+15$ or such that $RIR_V \geq 0.924*TL_V+20$ or such that $RIR_V \geq 0.870*TL_V+20$.

Advantageously, the substrate according to the invention is a glass characterized by a light transmission $TL_V$ lower than 91%, 90%, 89%, 88%, 85%, 80%, 75%, 70% or 50%. Advantageously, the substrate according to the invention is a glass characterized by an infrared reflection $RIR_V$ higher than 50%, 75%, 80%, 85%, 90%, 95%, 97%, 98% or 99%. The choices of $TL_V$ and $RIR_V$ within the domain defined by the invention vary mainly depending on the color of the glass and are related to the appearance and to the energy properties desired for the final glazing.

According to one advantageous embodiment, the substrate according to the invention is a glass characterized by an infrared reflection $RIR_V$ such that $RIR_V \geq 0.510*TL_V+53$ or such that $RIR_V \geq 0.490*TL_V+55$, more preferably such that $RIR_V \geq 0.435*TL_V+60$ or such that $RIR_V \geq 0.380*TL_V+65$, and even more preferably such that $RIR_V \geq 0.326*TL_V+70$.

Preferably, a clear substrate according to the invention is a glass characterized by $TL_V>85\%$ and $RIR_V>98\%$, or by $TL_V>87\%$ and $RIR_V>98.5\%$, or even by $TL_V>88\%$ and $RIR_V>99\%$.

Preferably, a colored substrate according to the invention is a glass characterized by, from lightest to darkest, $TL_V<80\%$ and $RIR_V>87\%$, or by $TL_V<70\%$ and $RIR_V>80\%$, or by $TL_V<50\%$ and $RIR_V>60\%$, or even by $TL_V<30\%$ and $RIR_V>40\%$.

The substrate according to the invention is made of glass which may belong to various categories. The glass can thus be a glass of soda-lime-silica, aluminosilicate or borosilicate type, and the like. Preferably, the base composition of the glass comprises, in a content expressed in percentages by total weight of glass:

| | |
|---|---|
| $SiO_2$ | 55-85% |
| $Al_2O_3$ | 0-30% |
| $B_2O_3$ | 0-20% |
| $Na_2O$ | 0-25% |
| CaO | 0-20% |
| MgO | 0-15% |
| $K_2O$ | 0-20% |
| BaO | 0-20%. |

More preferably, the base composition of the glass comprises, in a content expressed in percentage by total weight of glass:

| | |
|---|---|
| $SiO_2$ | 55-78% |
| $Al_2O_3$ | 0-18% |
| $B_2O_3$ | 0-18% |
| $Na_2O$ | 0-20% |
| CaO | 0-15% |
| MgO | 0-10% |
| $K_2O$ | 0-10% |
| BaO | 0-5%. |

Most preferably and for reasons of lower production costs, the glass substrate according to the invention is made of soda-lime-silica glass. Advantageously, according to this embodiment, the base composition of the glass comprises, in a content expressed in percentage by total weight of glass:

| | |
|---|---|
| $SiO_2$ | 60-75% |
| $Al_2O_3$ | 0-6% |
| $B_2O_3$ | 0-4% |
| CaO | 0-15% |
| MgO | 0-10% |
| $Na_2O$ | 5-20% |
| $K_2O$ | 0-10% |
| BaO | 0-5%. |

In addition to its base composition, the glass may comprise other components, of nature and quantity tailored to the sought-after effect.

One solution proposed in the invention for obtaining a glass with a very high reflection in the infrared $RIR_V$ consists in using chromium in the composition of the glass, in a range of specific contents.

Thus, according to a first embodiment, the glass advantageously has a composition that comprises, in a content expressed in percentage by total weight of glass:

| | |
|---|---|
| Total iron (expressed in the form of $Fe_2O_3$) | 0.002-0.06%; |
| $Cr_2O_3$ | 0.0001-0.06%. |

Such glass compositions combining a low iron content and chromium have demonstrated a particularly good performance in terms of infrared reflection $RIR_V$ and exhibit a high transparency in the visible and a not very pronounced tint, close to a what is called "extra-clear" glass. These compositions are described in international patent applications WO2014128016A1, WO2014180679A1, WO2015011040A1, WO2015011041A1, WO2015011042A1, WO2015011043A1 and WO2015011044A1, which are incorporated by reference into the present patent application. According to this first particular embodiment, the composition preferably comprises a chromium (expressed in the form of $Cr_2O_3$) content ranging from 0.002% to 0.06% by weight with respect to the total weight of the glass. Such chromium contents allow the infrared reflection $RIR_V$ to be further improved.

According to a second embodiment, the glass has a composition that comprises, in a content expressed in percentage by total weight of glass:

| | |
|---|---|
| Total iron (expressed in the form of $Fe_2O_3$) | 0.002-0.06%; |
| $Cr_2O_3$ | 0.0015-1%; |
| Co | 0.0001-1%. |

Such glass compositions based on chromium and cobalt have demonstrated a particularly good performance in terms of infrared reflection $RIR_V$, while offering advantageous possibilities in terms of aesthetics/color (bluish neutrality to an intense hue or even up to opacity). Such compositions are described in European patent application no. 13 198 445.4, which is incorporated by reference into the present patent application.

According to a third embodiment, the glass has a composition that comprises, in a content expressed in percentage by total weight of glass:

| | |
|---|---|
| Total iron (expressed in the form of $Fe_2O_3$) | 0.02-1%; |
| $Cr_2O_3$ | 0.002-0.5%; |
| Co | 0.0001-0.5%; |

Preferably, according to this embodiment, the composition comprises: 0.06%<total iron≤1%.

Such compositions based on chromium and cobalt allow glass sheets to be obtained with colors in the blue-green range, which are comparable in terms of color and light transmission to commercially available blue and green glasses, but with a particularly good performance in terms of infrared reflection. Such compositions are described in European patent application EP15172780.7, which is incorporated by reference into the present patent application.

According to a fourth embodiment, the at least first external glass sheet has a composition that comprises, in a content expressed in percentage by total weight of glass:

| | |
|---|---|
| Total iron (expressed in the form of $Fe_2O_3$) | 0.002-1%; |
| $Cr_2O_3$ | 0.001-0.5%; |
| Co | 0.0001-0.5%; |
| Se | 0.0003-0.5%. |

Such glass compositions based on chromium, cobalt and selenium have demonstrated a particularly good performance in terms of infrared reflection, while offering advantageous possibilities in terms of aesthetics/color (gray neutrality to a slight to intense hue in the gray-bronze range).

Such compositions are described in European patent application EP15172779.9, which is incorporated by reference into the present patent application.

Alternatively to chromium, other solutions using one or more components in specific contents to obtain a glass with a very high infrared reflection $RIR_V$ are also proposed according to the invention.

According to a first alternative embodiment, the glass has a composition that comprises, in a content expressed in percentage by total weight of glass:

| | |
|---|---|
| Total iron (expressed in the form of $Fe_2O_3$) | 0.002-0.06%; |
| $CeO_2$ | 0.001-1%. |

Such compositions are described in European patent application no. 13 193 345.9, which is incorporated by reference into the present patent application.

According to another alternative embodiment, the glass has a composition that comprises, in a content expressed in percentage by total weight of glass:

| | |
|---|---|
| Total iron (expressed in the form of $Fe_2O_3$) | 0.002-0.06%; | and one of the following components:
manganese (expressed in the form of MnO), in a content ranging from 0.01 to 1% by weight;
antimony (expressed in the form of $Sb_2O_3$), in a content ranging from 0.01 to 1% by weight;
arsenic (expressed in the form of $As_2O_3$), in a content ranging from 0.01 to 1% by weight;
or
copper (expressed in the form of CuO), in a content ranging from 0.0002 to 0.1% by weight.

Such compositions are described in European patent application no. 14 167 942.3, which is incorporated by reference into the present patent application.

According to yet another alternative embodiment, the glass has a composition that comprises, in a content expressed in percentage by total weight of glass:

| | |
|---|---|
| Total iron (expressed in the form of $Fe_2O_3$) | 0.002-0.04%; | and at least two components from chromium, selenium, copper, cerium, manganese and antimony; the chromium (expressed in the form of $Cr_2O_3$) being in a maximum content of 0.02% by weight; the selenium (expressed in the form of Se) being in a maximum content of 0.08% by weight; the copper (expressed in the form of CuO) being in a maximum content of 0.04% by weight; the cerium (expressed in the form of $CeO_2$) being in a maximum content of 0.8% by weight; the manganese (expressed in the form of MnO) being in a maximum content of 1.6% by weight; the antimony (expressed in the form of $Sb_2O_3$) being in a maximum content of 0.8% by weight; said composition respecting the formula:

$A \leq [10.02*(Cr_2O_3/Fe_2O_3)+4*(Se/Fe_2O_3)+2.73*(CuO/Fe_2O_3)+0.7*(CeO_2/Fe_2O_3)+0.23*(MnO/Fe_2O_3)+0.11*(Sb_2O_3/Fe_2O_3)]$; $A$ being equal to 0.30.

Such compositions are described in European patent application no. 14 177 487.7, which is incorporated by reference into the present patent application.

According to the invention, the composition of the glass substrate has a redox of less than 15%. Preferably, the redox is less than 10%, or else less than 5% or even less than 3%. The degree of oxidation of a glass is given by its redox, here defined as the ratio by weight of $Fe^{2+}$ atoms to the total weight of iron atoms present in the glass, $Fe^{2+}$/total Fe. Equivalently, the redox may also be calculated by expressing the weight of ferrous iron ($Fe^{2+}$) and of total iron in $Fe_2O_3$ form. Alternatively, redox is sometimes expressed as the ratio by weight of ferrous iron ($Fe^{2+}$) expressed in FeO form to total iron expressed in $Fe_2O_3$ form. In this case, the following relationship makes it possible to pass from one expression to the other:

$$\frac{Fe^{2+} \text{ in Fe form}}{Fe_{Total} \text{ in Fe form}} = \frac{Fe^{2+} \text{ in } Fe_2O_3 \text{ form}}{Fe_{Total} \text{ in } Fe_2O_3 \text{ form}} = 1.1113 * \frac{Fe^{2+} \text{ in FeO form}}{Fe_{Total} \text{ in } Fe_2O_3 \text{ form}}$$

The infrared-reflecting layer according to the invention may preferably be characterized by a light transmission $TL_C$ such that $TL_C \geq 1.35*TIR_C$, $TL_C \geq 1.4*TIR_C$, or $TL_C \geq 1.5*TIR_C$, more preferably such that $TL_C \geq 1.75*TIR_C$, $TL_C \geq 1.9*TIR_C$, or $TL_C \geq 1.95*TIR_C$, and even more preferably $TL_C \geq 2*TIR_C$.

Furthermore, the infrared-reflecting layer may have certain advantageous features depending on the type of application desired and/or effects wanted.

For low-emissivity applications, the layer may advantageously be characterized by an infrared reflection $RIR_C$ of value comprised between or equal to $0.5*(1-AIR_C)$ and $0.86*(1-AIR_C)$. In this range of values, solar factor is increased when a substrate made of glass of the prior art of same $TL_V$ is used, thus increasing the free supply of energy from the sun to the interior of the building for example. Other advantages according to the invention are also present, such as the limitation of heating of the glazing, the varied aesthetics and colors, the attenuated light reflection from the glass side, the correction of the color in reflection from the glass side, and/or the lesser angular dependence of the color in reflection from the glass side.

Alternatively, for the same applications, it may be advantageous to use in combination with the glass according to the invention, a layer having a $TIR_C$ lower than 50, 40, 35, 30, 25 or 20%.

Advantageously the infrared-reflecting layer used for these applications is a multilayer stack comprising n functional layers based on an infrared-reflecting material, with n=1 or 2, and n+1 dielectric coatings such that each functional layer is flanked by dielectric coatings.

For solar-control applications, including both a low-emissivity and anti-solar function, the layer may advantageously be characterized by an infrared reflection $RIR_C$ of value higher than $0.86*(1-AIR_C)$ and lower than or equal to $0.97*(1-AIR_C)$. In this range of values, the solar factor remains close to and slightly higher than that obtained when a substrate made of glass of the prior art of same $TL_V$ is used, and therefore has no particular advantageous effect on this property. However, other advantages according to the invention remain present, such as the limitation of heating of the glazing, the varied aesthetics and colors, the attenuated light reflection from the glass side, the correction of the color in reflection from the glass side, and/or the lesser angular dependence of the color in reflection from the glass side. Preferably, the layer may advantageously be characterized by an infrared reflection $RIR_C$ comprised between a $RIR_C$ such that $RIR_C \geq 0.90*(1-AIR_C)$, or $RIR_C \geq 0.95*(1-AIR_C)$, or even $RIR_C \geq 0.96*(1-AIR_C)$, and a $RIR_C$ such that $RIR_C \leq 0.97*(1-AIR_C)$.

Alternatively, for the same applications, it may be advantageous to use in combination with the glass according to the invention, a layer having a $TIR_C$ lower than 15, 10, 7.5, 5 or 3%.

Advantageously the infrared-reflecting layer used for these applications is a multilayer stack comprising n functional layers based on an infrared-reflecting material, with n=2, and n+1 dielectric coatings such that each functional layer is flanked by dielectric coatings.

For anti-solar applications, the layer may advantageously be characterized by an infrared reflection $RIR_C$ higher than $0.97*(1-AIR_C)$. In this range of values, the solar factor is lower than when a substrate made of glass of the prior art of same $TL_V$ is used, thus decreasing the energy transmitted to the interior and increasing the selectivity of the glazing. Other advantages according to the invention remain present, such as the limitation of heating of the glazing, the varied aesthetics and colors, the attenuated light reflection from the glass side, the correction of the color in reflection from the glass side, and/or the lesser angular dependence of the color in reflection from the glass side. Preferably, the layer may advantageously be characterized by an infrared to reflection $RIR_C$ such that $RIR_C \geq 0.98*(1-AIR_C)$, or $RIR_C \geq 0.99*(1-AIR_C)$.

Alternatively, for the same applications, it may be advantageous to use in combination with the glass according to the invention, a layer having a $TIR_C$ lower than 2.5, 2, 1.5 or 1%. Also alternatively, it may be advantageous to use in combination with the glass according to the invention, a layer having a reflection at each wavelength in the range 780 to 2500 nm, higher than 28, 30, 35 or 40%.

Advantageously the infrared-reflecting layer used for these applications is a multilayer stack comprising n functional layers based on an infrared-reflecting material, with n≥3, and n+1 dielectric coatings such that each functional layer is flanked by dielectric coatings.

The functional layers forming part of the infrared-reflecting layers are advantageously formed from noble metal. They may be based on silver, gold, palladium, platinum or a mixture or alloy thereof, but also based on copper or aluminum, alone, alloyed or in an alloy with one or more noble metals. Preferably, all the functional layers are silver-based. This is a noble metal that has a very high efficacy of reflection of infrared radiation. It is easily implemented in a magnetron device and its cost price is not prohibitive, especially with regard to its efficacy. Advantageously, the silver is doped with a few percent of palladium, aluminum or copper, for example in an amount of 1 to 10%, or it is possible to use a silver alloy.

The transparent dielectric coatings forming part of the infrared-reflecting layers are well known in the field of layers deposited by cathode sputtering. There are many suitable materials and there is no reason to give a complete list thereof here. They are in general metal oxides, oxynitrides or nitrides. Among the most common, mention may be made by way of example of $SiO_2$, $TiO_2$, $SnO_2$, $ZnO$, $ZnAlOx$, $Si_3N_4$, $AlN$, $Al_2O_3$, $ZrO_2$, $Nb_2O_5$, $YO_x$, $TiZrYO_x$, $TiNbO_x$, $HfO_x$, $MgO_x$, $TaO_x$, $CrO_x$ and $Bi_2O_3$, and mixtures thereof. Mention may also be made of the following materials: AZO, ZTO, GZO, $NiCrO_x$, TXO, ZSO, TZO, TNO, TZSO, TZAO and TZAYO. The term AZO refers to a zinc oxide doped with aluminum or to a mixed zinc and aluminum oxide, preferably obtained from a ceramic target formed by the oxide to be deposited, sputtered either under a neutral or slightly oxidizing atmosphere. Likewise, the expressions ZTO or GZO respectively refer to mixed titanium and zinc or zinc and gallium oxides, obtained from ceramic targets, either under a neutral or slightly oxidizing atmosphere. The expression TXO refers to titanium oxide obtained from a ceramic titanium-oxide target. The expression ZSO refers to a mixed zinc-tin oxide obtained either from a metal target of the alloy deposited under oxidizing atmosphere or from a ceramic target of the corresponding oxide, under a neutral or slightly oxidizing atmosphere. The expressions TZO, TNO, TZSO, TZAO or TZAYO respectively refer to mixed titanium-zirconium, titanium-niobium, titanium-zirconium-tin, titanium-zirconium-aluminum or titanium-zirconium-aluminum-yttrium oxides obtained from ceramic targets, either under a neutral or slightly oxidizing atmosphere. All the aforementioned materials may be used to form the dielectric coatings used in the present invention.

Preferably, the dielectric coating placed under one or under each functional layer comprises, in direct contact with the one or more functional layers, a layer based on a zinc oxide, optionally doped for example with aluminum or gallium, or alloyed with tin oxide. Zinc oxide may have a particularly favorable effect on the stability and resistance to corrosion of the functional layer, in particular when it is based on silver. It is also favorable to the improvement of the electrical conductability of a silver-based layer, and therefore to the obtainment of a low emissivity.

The various layers of the stack are, for example, deposited by low-pressure magnetron cathode sputtering, in a well-known magnetron device. The present invention is however not limited to this particular layer-deposition process.

The transparent coated substrates according to the invention may be used as single glazings or be assembled into multiple glazing such as triple or double glazings in which the glass sheet bearing the infrared-reflecting layer is associated with one or more other glass sheets, optionally provided with a coating, the infrared-reflecting layer being placed in contact with the interior space between the glass sheets.

For solar-control or anti-solar applications, the substrate coated with the infrared-reflecting layer is preferably assembled into a multiple glazing, for example a double or triple glazing, such that, when it is mounted on a building, the solar radiation first strikes the coated glass sheet on the side devoid of layer, then the infrared-reflecting layer, then the second glass sheet, and then optionally the third if it is a question of a triple glazing. The infrared-reflecting layer is therefore, according to the convention generally used, in position 2. It is in this position that the solar protection is most effective. For low-emissivity applications, the infrared-reflecting layer may be placed, according to the generally used convention, in position 2 or 3 of a double glazing and/or even in position 4 or 5 of a triple glazing.

The invention also encompasses a laminated glazing comprising at least one transparent substrate such as described above assembled with a sheet of vitreous material by way of an adhesive plastic material, generally PVB. Such a glazing may be used as glazing for a building or for a motor vehicle. In the field of automotive glazings, coated substrates according to the invention may be used for example as windshields but also for the other windows of the vehicle such as side windows or rear windshields.

By way of example, particular embodiments of the invention will now be described, with reference to Examples 1 to 35 according to the invention and to Comparative Example C1-C35 not according to the invention.

The main properties of the glasses used in the examples and comparative examples are given in table Ia. Their compositions, excluding $SiO_2$, are given in table Ib in percentages by weight. Table II for its part describes infrared-reflecting layers according to the invention, respecting the relationship $TL_C \geq 1.3*TIR_C$. Tables I and II use the terms as defined at the start of the present document.

In Table II,

ZSO5 represents a zinc-tin mixed oxide in which the proportion of zinc-tin is close to 50-50% by weight ($Zn_2Sn_2O_4$), ZnO:Al or AZO represents aluminum-doped zinc oxides (doping between 0.1 and 6% by weight of Al), TXO represents a titanium oxide obtained from a ceramic titanium-oxide target, TiN+C represents a temperable protective layer formed from a layer of titanium nitride covered with carbon. After heat treatment the carbon is burnt and the TiN layer oxidizes, NiCrW represents a mixed tungsten, nickel and chromium layer comprising 60% by weight tungsten and 40% of an 80/20 nickel/chromium alloy, SiN represents a silicon nitride, possibly used pure (>99%) or doped (in particular with Al, most often to a level of 8-10% by weight of Al), TZO represents a mixed titanium-zirconium oxide, in which the titanium-zirconium proportion is close to 65-35% by weight.

TABLE Ia

| Type of glass | $RIR_{V\,(ISO9050)}$ | $TL_{V\,(C,\,2)}$ | a* (D, 10) | b* (D, 10) |
|---|---|---|---|---|
| comp-clear | 76.8 | 89.7 | −0.9 | 0.2 |
| comp-extraclear | 95.4 | 91.5 | −0.1 | 0.1 |
| inv-clear | 99.2 | 89.9 | −0.9 | 0.6 |
| comp-green | 17.7 | 78.5 | −6.1 | 1.2 |
| inv-green | 97.1 | 75.5 | −5.4 | 0.4 |
| comp-dark green | 11 | 72.7 | −8.3 | 2 |
| inv-dark green | 96.8 | 71.1 | −7.3 | 1.4 |
| comp-green 'privacy' | 5 | 34.3 | −16.6 | 0.4 |
| inv-green 'privacy' | 91 | 41 | −16.1 | −1.1 |
| inv-blue | 96 | 77.2 | −3 | −2.9 |
| comp-dark blue | 18.4 | 66.7 | −6.6 | −8.1 |
| inv-dark blue | 95.1 | 64.2 | −5.4 | −8.3 |
| comp-blue 'privacy' | 6.7 | 46.5 | −12.7 | −11.8 |
| inv-blue 'privacy' | 90.4 | 42 | −10.6 | −12.2 |
| comp-light gray | 35.7 | 70.1 | −1.1 | 0 |
| inv-light gray | 97.1 | 70.1 | 0 | 0 |
| comp-gray | 42.7 | 55.7 | 0.9 | −2.1 |
| inv-gray | 95.2 | 55.9 | −1.4 | −1.9 |
| comp-gray 'privacy' | 7.7 | 17.4 | −1 | −0.1 |
| inv-gray 'privacy' | 87.3 | 17.3 | 1.2 | −0.9 |
| comp-bronze | 45.9 | 61 | 2.8 | 4.4 |
| inv-bronze | 96.6 | 58 | 2.6 | 4.3 |

TABLE Ib

| Type of glass | CaO (%) | K2O (%) | Na2O (%) | Fe2O3 (%) | SO3 (%) | TiO2 (%) | Al2O3 (%) | MgO (%) | ZrO2 (ppm) |
|---|---|---|---|---|---|---|---|---|---|
| comp-clear | 8.700 | 0.130 | 13.830 | 0.065 | 0.260 | 0.045 | 0.880 | 4.320 | 40 |
| comp-extraclear | 9.090 | 0.024 | 13.930 | 0.011 | 0.230 | 0.017 | 0.721 | 4.320 | 28 |
| inv-clear | 7.910 | 0.018 | 13.830 | 0.009 | 0.341 | <0.016 | 1.338 | 4.460 | 45 |
| comp-green | 8.990 | 0.148 | 13.650 | 0.595 | 0.186 | 0.049 | 0.803 | 4.080 | 74 |
| inv-green | 8.000 | 0.200 | 13.500 | 0.049 | 0.300 | | 1.000 | 4.500 | |
| comp-dark green | 8.440 | 0.143 | 13.880 | 0.832 | 0.153 | 0.048 | 0.931 | 4.150 | 49 |
| inv-dark green | 8.000 | 0.200 | 13.500 | 0.069 | 0.300 | | 1.000 | 4.500 | |
| comp-green 'privacy' | 8.330 | 0.157 | 13.700 | 1.552 | 0.136 | 0.048 | 0.928 | 4.020 | 53 |
| inv-green 'privacy' | 8.000 | 0.200 | 13.500 | 0.069 | 0.300 | | 1.000 | 4.500 | |
| inv-blue | 8.000 | 0.200 | 13.500 | 0.0086 | 0.352 | | 1.000 | 4.500 | 47 |
| comp-dark blue | 8.490 | 0.109 | 13.700 | 0.481 | 0.093 | 0.050 | 0.868 | 4.190 | |
| inv-dark blue | 8.000 | 0.200 | 13.500 | 0.043 | 0.300 | | 1.000 | 4.500 | |
| comp-blue 'privacy' | 8.460 | 0.134 | 13.820 | 0.822 | 0.070 | 0.052 | 0.951 | 4.170 | 48 |
| inv-blue 'privacy' | 8.000 | 0.200 | 13.500 | 0.042 | 0.300 | | 1.000 | 4.500 | |
| comp-light gray | 8.910 | 0.072 | 13.930 | 0.330 | 0.164 | 0.011 | 0.126 | 3.700 | 31 |
| inv-light gray | 8.000 | 0.200 | 13.500 | 0.075 | 0.300 | | 1.000 | 4.500 | |
| comp-gray | 8.800 | 0.219 | 13.770 | 0.346 | 0.308 | 0.031 | 0.865 | 4.180 | 44 |
| inv-gray | 8.000 | 0.200 | 13.500 | 0.043 | 0.300 | | 1.000 | 4.500 | |
| comp-gravy 'privacy | 8.520 | 0.232 | 13.700 | 0.371 | 0.153 | 0.047 | 1.008 | 4.180 | 50 |
| inv-bronze 'privacy' | 8.000 | 0.200 | 13.500 | 0.067 | 0.300 | | 1.000 | 4.500 | |
| comp-bronze | 8.880 | 0.122 | 13.540 | 0.313 | 0.250 | 0.037 | 0.670 | 4.240 | 41 |
| inv-bronze | 8.000 | 0.200 | 13.500 | 0.040 | 0.300 | | 1.000 | 4.500 | |

| Type of glass | MnO (ppm) | BaO (ppm) | Co (ppm) | Se (ppm) | Cr2O3 (ppm) | V2O5 (ppm) | Ni (ppm) |
|---|---|---|---|---|---|---|---|
| comp-clear | 200 | 40 | | | | | |
| comp-extraclear | | | 0.25 | | | | |
| inv-clear | <10 | | 4.000 | | 46 | | |
| comp-green | 201 | 38 | | | | | |
| inv-green | | | 29 | | 330 | | |
| comp-dark green | 191 | 46 | | | | | 14 |
| inv-dark green | | | 36 | | 470 | | |
| comp-green 'privacy' | 202 | 49 | 79 | | 214 | 425 | |
| inv-green 'privacy' | | | 128 | | 1370 | | |
| inv-blue | | | 41 | | 65 | | |
| comp-dark blue | 224 | 49 | 44 | <3 | 24 | | |
| inv-dark blue | | | 73 | | 287.7 | | |
| comp-blue 'privacy' | 230 | 55 | 90 | | 205 | | |
| inv-blue 'privacy' | | | 152 | | 840 | | |
| comp-light gray | 39 | <21 | 23 | 7 | <6 | | |
| inv-light gray | | | 36 | 74 | 111 | | |
| comp-gray | 120 | | 64 | 20 | | | 17 |
| inv-gray | | | 69.9 | 200 | 287.8 | | |
| comp-gravy 'privacy | 191 | 56 | 15 | | | | |
| inv-bronze 'privacy' | | | 215 | 560 | 800 | | |

TABLE Ib-continued

| | | | | | |
|---|---|---|---|---|---|
| comp-bronze | 216 | 52 | 30 | 27 | 33 |
| inv-bronze | | | 44.9 | 340.8 | 200 |

TABLE II

| | | | | | | | | | | |
|---|---|---|---|---|---|---|---|---|---|---|
| A | $TL_C$ | $TIR_C$ | $RIR_C$ | $AIR_C$ | ZSO5 | ZnO | Ag | Ti | ZnO:Al | ZSO5 | ZnO |
| | 54 | 0.6 | 82.5 | 16.9 | 400 Å | 150 Å | 70 Å | | | 700 Å | |
| B | $TL_C$ | $TIR_C$ | $RIR_C$ | $AIR_C$ | ZSO5 | ZnO | Ag | Ti | ZnO:Al | ZSO5 | ZnO |
| | 68 | 0.6 | 91.3 | 8.1 | 350 Å | 120 Å | 25 Å | | | 680 Å | |
| C | $TL_C$ | $TIR_C$ | $RIR_C$ | $AIR_C$ | ZSO5 | ZnO | Ag | Ti | ZnO:Al | ZSO5 | ZnO |
| | 56 | 7.2 | 72.9 | 19.9 | 376 Å | | 92 Å | 30 Å | | 844 Å | |
| D | $TL_C$ | $TIR_C$ | $RIR_C$ | $AIR_C$ | ZSO5 | ZnO | Ag | Ti | ZnO:Al | ZSO5 | ZnO |
| | 40 | 3.5 | 79.8 | 16.7 | 390 Å | | 84 Å | 60 Å | | 885 Å | |
| E | $TL_C$ | $TIR_C$ | $RIR_C$ | $AIR_C$ | ZSO5 | ZnO | Ag | Ti | ZnO:Al | ZSO5 | ZnO |
| | 45 | 2.8 | 68.0 | 29.2 | 369 Å | | 164 Å | 31 Å | | 805 Å | |
| F | $TL_C$ | $TIR_C$ | $RIR_C$ | $AIR_C$ | SiN | NiCr | Ag | NiCr | SiN | | |
| | 58 | 17.6 | 68.5 | 13.9 | 400 Å | 13 Å | 166 Å | 16 Å | 510 Å | | |
| G | $TL_C$ | $TIR_C$ | $RIR_C$ | $AIR_C$ | TiO2 | ZnO | Ag | AZO | ZSO5 | SiN | TZO |
| | 92 | 41.4 | 52.3 | 6.3 | 250 Å | 30 Å | 115 Å | 40 Å | 150 Å | 210 Å | 40 Å |

| | | | | | | | | | | |
|---|---|---|---|---|---|---|---|---|---|---|
| A | Ag | TXO | ZnO:Al | ZSO5 | | ZnO | Ag | TXO | ZnO:Al | ZSO5 | TiO2 |
| | 95 Å | 30 Å | | 400 Å | | | 105 Å | 30 Å | | 250 Å | 10 Å |
| B | Ag | Ti | ZnO:Al | ZSO5 | | ZnO | Ag | Ti | ZnO:Al | ZSO5 | TiO2 |
| | 105 Å | 30 Å | | 500 Å | | | 140 Å | 20 Å | | 230 Å | 10 Å |
| C | Ag | Ti | ZnO:Al | ZSO5 | | TiO2 | | | | | |
| | 177 Å | 71 Å | | 299 Å | | 10 Å | | | | | |
| D | Ag:Pd | Ti | ZnO:Al | ZSO5 | | TiN + C | | | | | |
| | 260 Å | 60 Å | | 240 Å | | 35 Å + 50 Å | | | | | |
| E | Ag | Ti | ZnO:Al | ZSO5 | | TiO2 | | | | | |
| | 132 Å | 61 Å | | 308 Å | | 10 Å | | | | | |
| F | | | | | | | | | | | |
| G | | | | | | | | | | | |

In all the following tables, unless otherwise indicated, the measurements are given for double glazings comprising from the exterior a coated first glass-substrate (layer in position 2) of 6 mm thickness, a gas-filled space of 15 mm filled with 90% argon and 10% air, and a second standard clear glass of 4 mm thickness. The properties in terms of light transmission (TL), light reflection (RL), solar factor (g), selectivity (select=TL/g) absorption (Abs), unless otherwise indicated, are given according to standard EN410: 2011, under illuminant D65, 2°. The a*, b* colors are given according to the CIE Lab model defined in 1976 by the Commission internationale de l'éclairage (CIE), under illuminant D, 10°. The total absorption (Abs tot) is the energy absorption of the complete laminated glazing. The absorption of the glass substrate coated with the layer (Abs VR+C) is the energy absorption of the exterior glass of the double glazing and of the layer that it bears.

TABLE A

| ex. | Substrate | Layer | TL | g | select | Abs tot |
|---|---|---|---|---|---|---|
| C1 | comp-clear | A | 47.5 | 22.7 | 2.09 | 42.9 |
| C1' | comp-extraclear | A | 48.7 | 23.1 | 2.11 | 33.1 |
| 1 | inv-clear | A | 47.5 | 22.4 | 2.12 | 32.4 |
| C2 | comp-green | A | 37.0 | 17.9 | 2.07 | 76.1 |
| 2 | inv-green | A | 37.0 | 17.7 | 2.09 | 42.4 |
| C3 | comp-dark green | A | 33.9 | 16.5 | 2.06 | 78.9 |
| 3 | inv-dark green | A | 33.9 | 16.3 | 2.08 | 45.0 |
| C4 | comp-green 'privacy' | A | 15.5 | 9.6 | 1.62 | 89.1 |
| 4 | inv-green 'privacy' | A | 15.5 | 8.9 | 1.75 | 59.2 |
| C5 | comp-dark blue | A | 29.2 | 16.2 | 1.81 | 77.5 |
| 5 | inv-dark blue | A | 29.2 | 15.8 | 1.85 | 46.0 |
| C6 | comp-blue 'privacy' | A | 16.0 | 10.7 | 1.50 | 87.4 |
| 6 | inv-blue 'privacy' | A | 16.0 | 10.2 | 1.56 | 57.3 |
| C7 | comp-gray | A | 23.7 | 13.9 | 1.71 | 72.8 |
| 7 | inv-gray | A | 23.7 | 13.3 | 1.78 | 50.0 |

TABLE A-continued

| ex. | Substrate | Layer | TL | g | select | Abs tot |
|---|---|---|---|---|---|---|
| C8 | comp-gray 'privacy' | A | 4.3 | 5.8 | 0.74 | 93.4 |
| 8 | inv-gray 'privacy' | A | 4.3 | 5.5 | 0.78 | 65.1 |
| C9 | comp-bronze | A | 24.8 | 13.8 | 1.80 | 73.6 |
| 9 | inv-bronze | A | 24.9 | 13.4 | 1.85 | 49.2 |

TABLE B

| ex. | Substrate | Layer | $T_L$ | g | select | Abs tot |
|---|---|---|---|---|---|---|
| C10 | comp-clear | B | 59.7 | 28.3 | 2.11 | 37.4 |
| C10' | comp-extraclear | B | 61.2 | 29.0 | 2.11 | 27.7 |
| 10 | inv-clear | B | 59.7 | 28.1 | 2.12 | 26.7 |
| C11 | comp-green | B | 46.4 | 21.8 | 2.13 | 73.5 |
| 11 | inv-green | B | 46.4 | 21.8 | 2.13 | 35.8 |
| C12 | comp-dark green | B | 42.6 | 20.0 | 2.13 | 76.6 |
| 12 | inv-dark green | B | 42.6 | 20.0 | 2.12 | 38.5 |
| C13 | comp-green 'privacy' | B | 19.5 | 11.2 | 1.75 | 87.8 |
| 13 | inv-green 'privacy' | B | 19.5 | 10.4 | 1.88 | 54.4 |
| C14 | comp-dark blue | B | 36.7 | 19.7 | 1.86 | 75.3 |
| 14 | inv-dark blue | B | 36.7 | 19.4 | 1.89 | 40.0 |
| C15 | comp-blue 'privacy' | B | 20.0 | 12.6 | 1.59 | 86.0 |
| 15 | inv-blue 'privacy' | B | 20.1 | 12.2 | 1.64 | 52.2 |
| C16 | comp-gray | B | 29.9 | 16.9 | 1.77 | 69.4 |
| 16 | inv-gray | B | 29.8 | 16.3 | 1.83 | 44.0 |
| C17 | comp-gray 'privacy' | B | 5.4 | 6.3 | 0.86 | 92.8 |
| 17 | inv-gray 'privacy' | B | 5.4 | 6.1 | 0.89 | 61.2 |
| C18 | comp-bronze | B | 31.3 | 16.7 | 1.88 | 70.3 |
| 18 | inv-bronze | B | 31.4 | 16.5 | 1.91 | 42.8 |

TABLE D

| Comp. | Substrate | Layer | $T_L$ | RL out | g | select | Abs tot |
|---|---|---|---|---|---|---|---|
| C21 | comp-clear | D | 35.7 | 30.7 | 21.0 | 1.7 | 39.6 |
| 21 | inv-dark blue | B | 36.7 | 7.6 | 19.4 | 1.9 | 40.0 |

TABLE C

| ex. | Substrate | Layer | transmission ||| exterior reflection ||| g | select | Abs VR + C |
| | | | TL (D, 2°) | a* (D, 10°) | b* (D, 10°) | RL out (D, 2°) | a* (D, 10°) | b* (D, 10°) | | | |
|---|---|---|---|---|---|---|---|---|---|---|---|
| C19 | comp-extraclear | A | 48.7 | −7.0 | 3.9 | 18.2 | −4.0 | −13.7 | 23.1 | 2.15 | 32.5 |
| 19 | inv-blue | B | 48.8 | −8.4 | 0.7 | 9.9 | −3.5 | −8.4 | 23.8 | 2.09 | 32.8 |
| 20 | inv-blue | A | 38.8 | −9.8 | 0.3 | 13.4 | −4.7 | −14.4 | 19.2 | 2.05 | 39.2 |

TABLE E

| Comp. | Substrate | Layer | $T_L$ | g | select | Abs tot |
|---|---|---|---|---|---|---|
| C22 | comp-clear | C | 49.7 | 28.0 | 1.77 | 42.0 |
| 22 | inv-clear | C | 49.8 | 28.5 | 1.75 | 31.0 |
| C23 | comp-green | C | 41.0 | 21.4 | 1.91 | 71.0 |
| 23 | inv-green | C | 38.7 | 23.1 | 1.67 | 42.0 |
| C24 | comp-bronze | C | 28.0 | 18.1 | 1.55 | 69.2 |
| 24 | inv-bronze | C | 26.1 | 18.6 | 1.40 | 49.1 |
| C25 | comp-green | D | 27.6 | 15.5 | 1.78 | 75.5 |
| 25 | inv-green | D | 27.7 | 17.0 | 1.63 | 41.1 |
| C26 | comp-gray | D | 17.8 | 13.4 | 1.33 | 72.2 |
| 26 | inv-gray | D | 17.7 | 13.6 | 1.31 | 49.3 |
| C27 | comp-clear | E | 40.1 | 21.1 | 1.90 | 51.3 |
| 27 | inv-clear | E | 40.1 | 21.0 | 1.91 | 42.1 |
| C28 | comp-dark green | E | 28.6 | 15.0 | 1.91 | 81.5 |
| 28 | inv-dark green | E | 28.6 | 15.9 | 1.81 | 53.2 |
| C29 | comp-gray | E | 20.0 | 13.4 | 1.49 | 76.1 |
| 29 | inv-gray | E | 20.0 | 13.3 | 1.50 | 57.5 |
| C30 | comp-green | F | 42.0 | 23.6 | 1.78 | 67.1 |
| 30 | inv-green | F | 39.6 | 28.8 | 1.38 | 36.2 |
| C31 | comp-dark green | F | 37.5 | 20.4 | 1.84 | 73.3 |
| 31 | inv-dark green | F | 36.3 | 27.0 | 1.34 | 39.5 |
| C32 | comp-dark blue | F | 33.1 | 21.5 | 1.54 | 70.5 |
| 32 | inv-dark blue | F | 31.3 | 26.7 | 1.17 | 40.5 |
| C33 | comp-clear | G | 79.9 | 57.9 | 1.38 | 23.0 |
| 33 | inv-clear | G | 80.0 | 61.7 | 1.30 | 12.5 |
| C34 | comp-green | G | 65.9 | 37.3 | 1.77 | 58.2 |
| 34 | inv-green | G | 62.2 | 50.7 | 1.23 | 26.4 |
| C35 | comp-gray | G | 39.6 | 34.1 | 1.16 | 58.6 |
| 35 | inv-gray | G | 40.0 | 42.7 | 0.94 | 36.3 |

EXAMPLES 1 TO 18 AND COMPARATIVE EXAMPLES C1 TO C18

Highly selective layers, according to the invention and furthermore respecting the relationship $RIR_C>0.97*(1-AIR_C)$, have been combined with different classes, certain of which, not according to the invention (referenced comp-), have an infrared reflection $RIR_V$ lower than 1.087 times their light transmission $TL_V$, and others, according to the invention (referenced inv-), have an infrared reflection $RIR_V$ higher than or equal to 1.087 times their light transmission $TL_V$. For double glazings, simulated values of light transmission, solar factor, selectivity and total absorption are given in table A for combinations with layer A and in table B for combinations with layer B.

In order to be able to easily compare the properties of the glazings according to the invention and not according to the invention of equivalent TL, the thickness of the substrate made of glass not according to the invention coated with the layer was engineered by simulation. This approach is valid because the initial TL differences were minimal.

These results show that the combined use of a glass having an infrared reflection such that $RIR_V \geq 1.087*TL_V$ and a layer satisfying the relationship $TL_C \geq 1.3*TIR_C$, and the relationship $RIR_C>0.97*(1-AIR_C)$, provides, at equivalent TL, a decrease in the solar factor and an increase in selectivity, or at the very least an unchanged selectivity and solar factor, at the same time as a very significantly lower absorption. These combinations may advantageously be used for anti-solar applications.

EXAMPLE 19 AND COMPARATIVE EXAMPLE C19

Example 19 and Comparative Example C19 of Table C demonstrate inter alia the advantage of the present invention in terms of light reflection from the glass side, i.e. seen from the exterior. To be noted for this table: the absorption 'Abs VR+C' is given according to standard ISO9050:2003.

Example 19 shows that via the combination of a substrate made of glass according to the invention and an infrared-reflecting layer according to the invention, it is possible to achieve properties similar to already known structures (C 19), but while avoiding too high an exterior light reflection (RL out) (~10% instead of ~18%). This combination therefore provides a selective product of low light reflection and of neutral color, having an absorption that is low enough to avoid the need to temper the glass (commonly accepted typical limit: ≤40-45%). The production of the layer on the colored glass of Example 19 is easier, and therefore advantageous for the yield and cost of production, because the color of the substrate allows the deviation of color of the layer to be attenuated and thus a better color uniformity to be obtained.

EXAMPLE 20

Example 20 of Table C demonstrates the advantage of combining highly selective layers that offer a light transmission on standard clear glass of about 50% with a blue colored glass according to the present invention, to obtain a product with a light transmission of about 40% (or less), a light-transmission zone in which there are at the present time few highly selective products and that it is difficult to achieve with conventional colored or clear substrates, without increasing exterior light reflection or absorption. This product obtained according to the invention has for its part an absorption that is low enough to avoid the need to temper the glass, a high selectivity and a low to average exterior light reflection, this being highly appreciated.

EXAMPLE 21 AND COMPARATIVE EXAMPLE 21

In Table D, Example 21 shows that by virtue of the combination of a substrate made of glass according to the invention and an infrared-reflecting layer characterized by an infrared reflection $RIR_C$ such that $RIR_C>0.97*(1-AIR_C)$, it is possible to achieve properties similar to already known structures (C 21), mainly in terms of light transmission, but while avoiding too high an exterior light reflection (~8% instead of ~31%), while decreasing solar factor and improving selectivity, and while retaining a glazing that does not need to be tempered (total absorption=40).

EXAMPLES 22 TO 35 AND COMPARATIVE EXAMPLES C22 TO C35

Various layers according to the invention have been combined with different glasses, certain of which, not according to the invention (referenced comp-), have an infrared reflection $RIR_V$ lower than 1.087 times their light transmission $TL_V$, and others, according to the invention (referenced inv-), have an infrared reflection $RIR_V$ higher than or equal to 1.087 times their light transmission $TL_V$. For double glazings, simulated values of light transmission, solar factor, selectivity and total absorption are given in Table E.

In order to be able to easily compare the properties of the glazings according to Examples 25 to 29 and Comparative Example C25 to C29 of equivalent TL, the thickness of the substrate made of glass not according to the invention coated with the layer was engineered by simulation. This approach is valid because the initial TL differences were minimal.

Combinations according to the invention with layers C, D and E will generally rather be used for solar-control applications. Solar factor is slightly increased or similar with glasses according to the invention, but total absorption is clearly less.

Combinations according to the invention with layers F and G will generally rather be used for low-emissivity applications. The solar factor is greatly increased with glasses according to the invention, thus increasing the supply of free energy, and the total absorption is clearly decreased.

The invention claimed is:

1. A transparent substrate coated with an infrared-reflecting layer, wherein the substrate is a glass comprising a composition which has a redox lower than 15%, characterized by an infrared reflection $RIR_V$ between 780 and 2500 nm such that $RIR_V \geq 1.087*TL_V$, $TL_V$ being the light transmission of the glass between 380 and 780 nm, and in that the infrared-reflecting layer is characterized by a light transmission $TL_C$ between 380 and 780 nm such that $TL_C \geq 1.3*TIR_C$, $TIR_C$ being the infrared transmission of the layer between 780 and 2500 nm.

2. The coated substrate as claimed in claim 1, wherein the substrate is a glass characterized by an infrared reflection $RIR_V$ such that $RIR_V \geq 1.087*TL_V+5$.

3. The coated substrate as claimed in claim 1, characterized by an infrared reflection $RIR_V$ such that $RIR_V \geq 0.510*TL_V+53$.

4. The coated substrate as claimed in claim 1, wherein the glass of the substrate has a composition that comprises, in a content expressed in percentage by total weight of glass:

| | |
|---|---|
| Total iron (expressed in the form of $Fe_2O_3$) | 0.002-0.06%; and |
| $Cr_2O_3$ | 0.0001-0.06%. |

5. The coated substrate as claimed in claim 1, wherein the glass of the substrate has a composition that comprises, in a content expressed in percentages by total weight of glass:

| | |
|---|---|
| Total iron (expressed in the form of $Fe_2O_3$) | 0.002-0.06%; |
| $Cr_2O_3$ | 0.0015-1%; |
| Co | 0.0001-1%. |

6. The coated substrate as claimed in claim 1, wherein the glass of the substrate has a composition that comprises, in a content expressed in percentages by total weight of glass:

| | |
|---|---|
| Total iron (expressed in the form of $Fe_2O_3$) | 0.02-1%; |
| $Cr_2O_3$ | 0.002-0.5%; |
| Co | 0.0001-0.5%. |

7. The coated substrate as claimed in claim 1, wherein the glass of the substrate has a composition that comprises, in a content expressed in percentages by total weight of glass:

| | |
|---|---|
| Total iron (expressed in the form of $Fe_2O_3$) | 0.002-1%; |
| $Cr_2O_3$ | 0.0010-0.5%; |
| Co | 0.0001-0.5%; |
| Se | 0.0003-0.5%. |

8. The coated substrate as claimed in claim 1, wherein the infrared-reflecting layer is characterized by an infrared reflection $RIR_C$ of value comprised between or equal to $0.5*(1-AIR_C)$ and $0.86*(1-AIR_C)$.

9. The coated substrate as claimed in claim 1, wherein the infrared-reflecting layer is characterized by an infrared reflection $RIR_C$ of value higher than $0.86*(1-AIR_C)$ and lower than or equal to $0.97*(1-AIR_C)$.

10. The coated substrate as claimed in claim 1, wherein the infrared-reflecting layer is characterized by an infrared reflection $RIR_C$ of value higher than $0.97*(1-AIR_C)$.

11. The coated substrate as claimed in claim 1, wherein the infrared-reflecting layer is a multilayer stack comprising n functional layers based on an infrared-reflecting material, with $n \geq 1$, and n+1 dielectric coatings such that each functional layer is flanked by dielectric coatings.

12. The coated substrate as claimed in claim 11, wherein the functional layers of the infrared-reflecting layer are silver-based.

* * * * *